United States Patent
Paul

(10) Patent No.: US 6,835,036 B2
(45) Date of Patent: Dec. 28, 2004

(54) CONCRETE ANCHOR

(75) Inventor: Sigismund D. Paul, Park Ridge, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/384,091

(22) Filed: Mar. 7, 2003

(65) Prior Publication Data

US 2004/0175251 A1 Sep. 9, 2004

(51) Int. Cl.⁷ .................................................. F16B 13/06
(52) U.S. Cl. ................................ 411/54; 411/16; 411/71
(58) Field of Search ............................. 411/71, 74, 16–18, 411/438, 54

(56) References Cited

U.S. PATENT DOCUMENTS

| | | | | |
|---|---|---|---|---|
| 806,407 A | * | 12/1905 | Farrington | 411/17 |
| 1,407,570 A | * | 2/1922 | Peirce | 411/17 |
| 3,898,907 A | | 8/1975 | Fischer | |
| 3,967,525 A | | 7/1976 | Lerich | |
| 3,968,721 A | | 7/1976 | Fischer | |
| 4,154,140 A | | 5/1979 | Zeilon | |
| 4,181,060 A | | 1/1980 | Payne | |
| 4,193,246 A | * | 3/1980 | Schiefer et al. | 52/698 |
| 4,613,264 A | | 9/1986 | McIntyre et al. | |
| 4,712,955 A | * | 12/1987 | Reece et al. | 411/17 |
| 5,006,023 A | * | 4/1991 | Kaplan | 411/17 |
| 5,042,888 A | | 8/1991 | Shinjo | |
| 5,634,750 A | * | 6/1997 | Frischmann et al. | 411/33 |

FOREIGN PATENT DOCUMENTS

WO          00/32946          6/2000

* cited by examiner

*Primary Examiner*—William L. Miller
(74) *Attorney, Agent, or Firm*—Lisa M. Soltis; Mark W. Croll; Donald J. Breh

(57) ABSTRACT

An expansion anchor comprises a stud having threads including a root, a land, and a taper extending between the root and the land and a helical member having a leading edge threadingly engageable with the threads, wherein the helical member is movable between an unexpanded position and an expanded position, wherein in the expanded position the leading edge is forced radially outwardly by the land. In one embodiment, the helical member includes a finger extending in a leading direction. A method also is disclosed for anchoring the inventive stud within a hole in a substrate by expanding the helical member until the leading edge is wedged between the land and a wall of the hole.

10 Claims, 2 Drawing Sheets

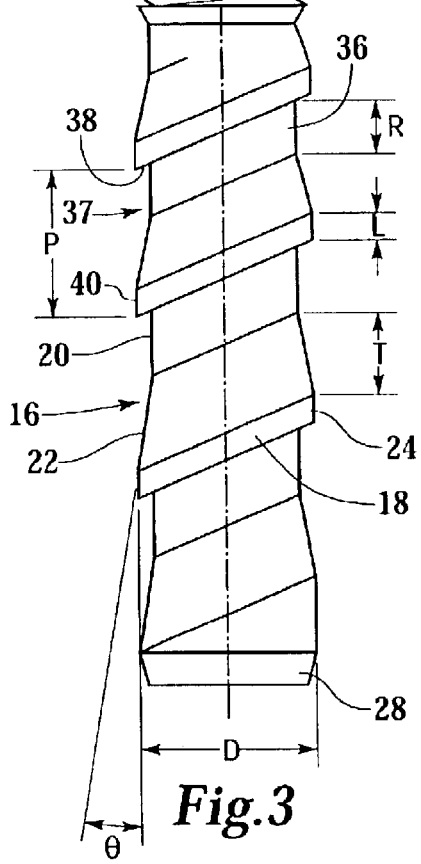
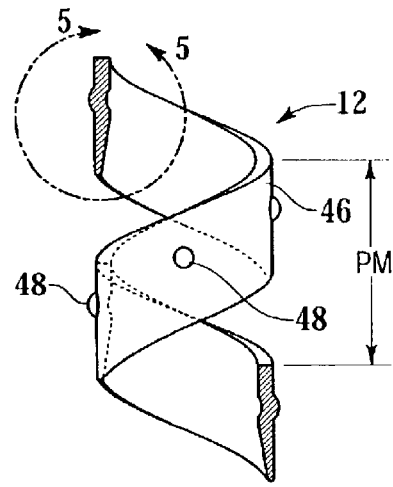
Fig.4
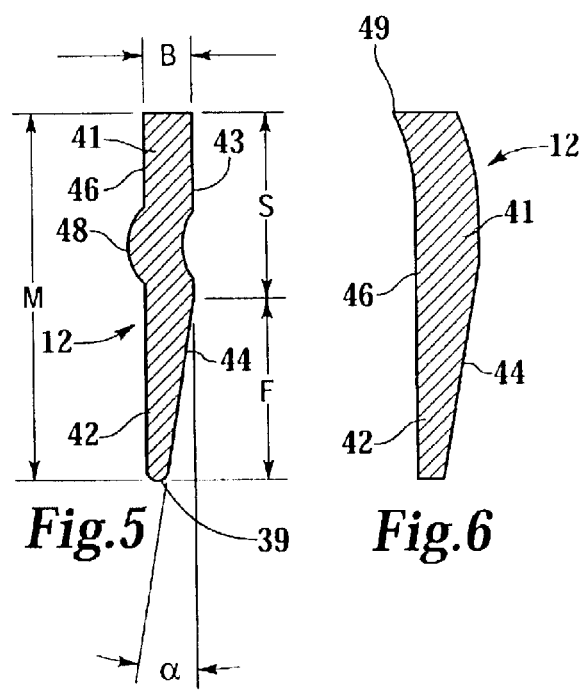
Fig.5   Fig.6
Fig.3

CONCRETE ANCHOR

BACKGROUND OF THE INVENTION

1. Field of the Invention

The present invention is directed to an expansion anchor for use in a substrate, more particularly to an expansion anchor for use in holes formed in concrete, cement or masonry.

2. Description of the Related Art

Expansion anchors are known generally for use in a substrate, for example, in the construction industry as lifting anchors for concrete walls, as in U.S. Pat. No. 6,279,274, or for bracing concrete walls and floors of new buildings.

Conventional wedge anchors include a stud and an expansion sleeve or other element that is disposed around the stud, wherein the expansion sleeve is expanded to engage with a wall of a hole to anchor the stud within the hole. Examples of such anchors are disclosed in U.S. Pat. Nos. 3,855,896, 4,291,608 and 5,816,759.

Anchors such as those described typically fail due to pull-out when an overloading force is applied. This is particularly true for concrete and masonry substrates. Pull-out failure occurs when the expansion sleeve pulls through the substrate so that the sleeve and the stud are pulled out of the hole. Pull-out failure is not easily predictable, and can occur over a wide range of forces. For example, for a concrete substrate, an anchor can pull out at about 9,000 pounds of force, and can be predicted within about 3,000 pounds. This range can make engineering design based on the strength of the anchor difficult.

Hard expansion sleeves or expansion members tend to pull out of the substrate easier, particularly hard round wires or members with sharp edges. The hard members tend to cause broaching through the substrate because they are hard enough to pull through the substrate.

Further, traditional expansion anchors can only be removed by either applying enough force to broach the substrate and pull the anchor out of the hole or by cutting the stud off at the hole. Neither option allows the stud to be reused.

Attempts have been made to overcome the above described shortcomings, for example International application WO 00/32946, in particular FIGS. 14A, 14B and 15, and page 15 of the specification which teach a hard spiral member that expands outwardly radially. However, this reference appears to have the same broaching problems as described above.

What is needed is an anchor for use in substrates, particularly in concrete, cement or masonry, that is strong, has a predetermined failure strength, and that preferably can be removed and reused without having to broach or cut the stud.

BRIEF SUMMARY OF THE INVENTION

In accordance with the present invention, an expansion anchor is provided. The inventive anchor includes a stud having threads including a root, a land, and a taper extending between the root and the land. The expansion anchor of the present invention also includes a helical member threadingly engageable with the threads of the stud, the helical member having a leading edge. The helical member is movable between an unexpanded position and an expanded position, wherein in the expanded position the leading edge is forced radially outwardly by the land.

In another aspect of the invention, an expansion anchor is provided comprising a helical member and a stud having threads. The helical member is threadingly engageable with the threads, and the helical member has a finger extending in a leading direction. The helical member is movable between an unexpanded position and an expanded position.

Also in accordance with the invention, a method for anchoring a stud within a substrate is provided. The inventive method includes the steps of providing a stud having a leading end with threads having a root, a land, and a taper extending between the root and the land, providing a helical member having a leading edge, threadingly engaging the helical member with the threads, inserting the leading end of the stud into a hole in a substrate, the hole having a wall, withdrawing the stud from the hole so that the stud moves a predetermined distance relative to the helical member, and expanding the helical member until the leading edge is wedged between the land and the wall.

The present invention provides a novel expansion anchor for use in anchoring a stud within a substrate that resists failure due to pullout, has a predetermined failure strength and, in another aspect, the stud can be removed and reused.

These and other objects, features and advantages are evident from the following description of an embodiment of the present invention, with reference to the accompanying drawings.

BRIEF DESCRIPTION OF THE SEVERAL VIEWS OF THE DRAWINGS

FIG. 3 is a side view of a stud of the expansion anchor.

FIG. 4 is a side view of the helical member.

FIG. 5 is a cross-sectional view of the helical member taken along the line 5—5 in FIG. 4.

FIG. 6 is a cross-sectional view of an alternative helical member.

DETAILED DESCRIPTION OF THE INVENTION

Figure 1:
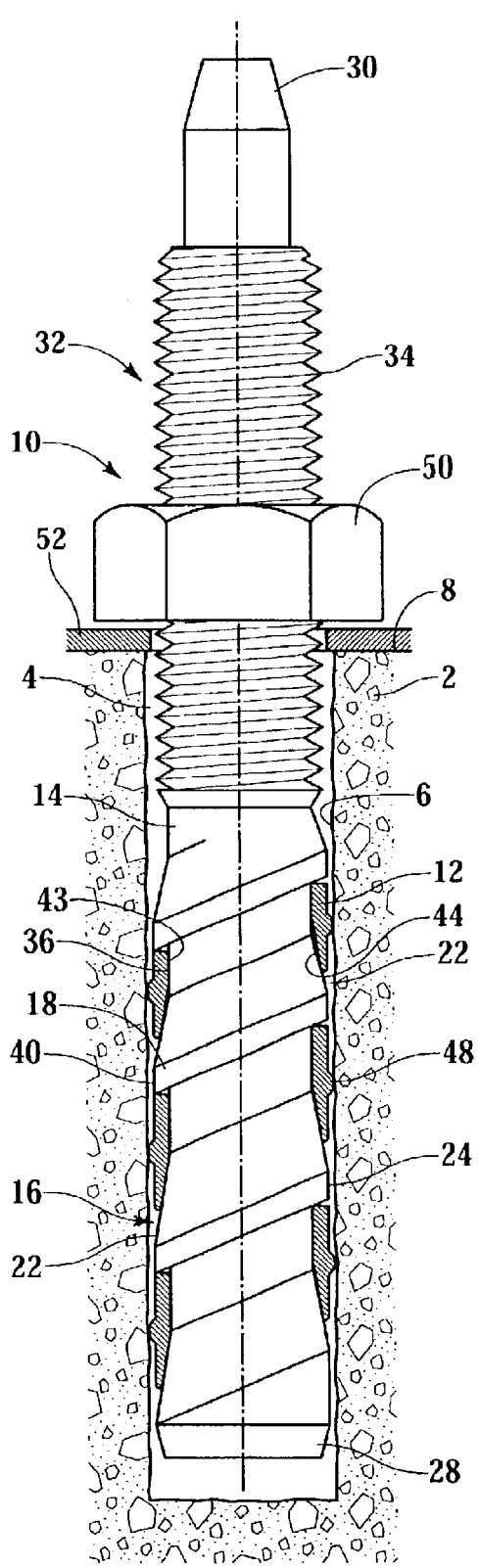
FIG. 1 is a partial side-sectional view of an expansion anchor within a hole in a substrate wherein a helical member is in an unexpanded position.
Figure 2:
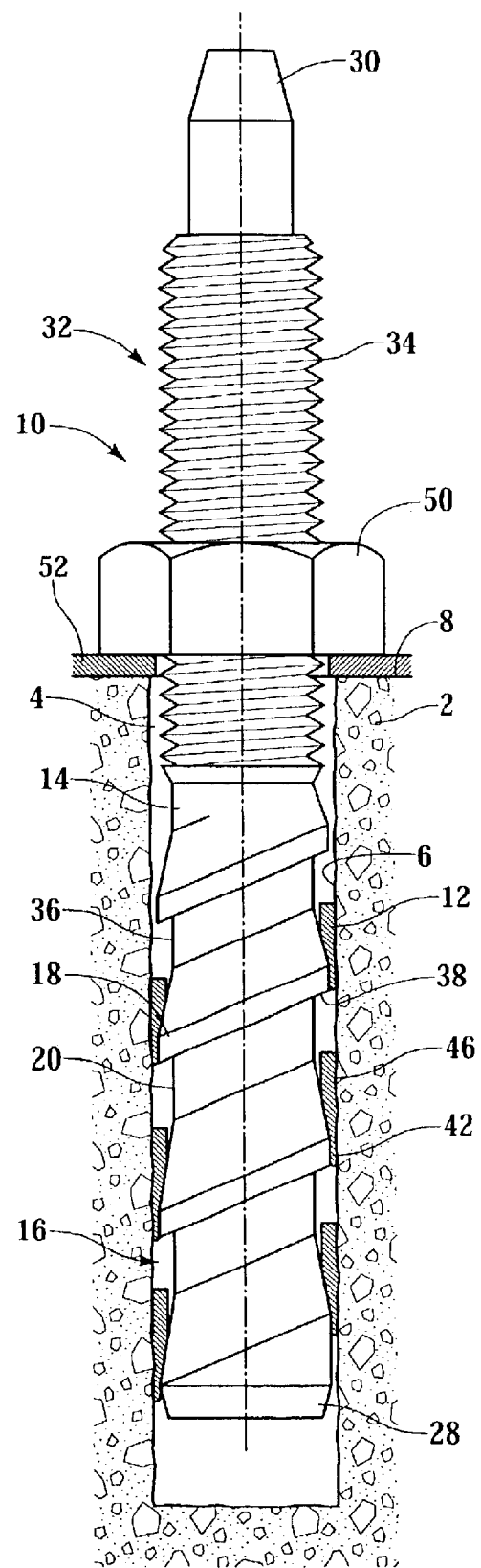
FIG. 2 is a partial side-sectional view of the expansion anchor with the hole in the substrate, wherein the helical member is in an expanded position.

Referring to FIGS. 1 and 2, an expansion anchor 10 is shown for use in a substrate 2, such as concrete, cement, masonry, or solid materials such as steel or plastic. The inventive expansion anchor 10 of the present invention includes a generally helical member 12, best seen in FIG. 4, which is threadingly engageable around a stud 14. Stud 14 includes an ultracoarse threaded portion 16 having generally helical ultracoarse threads 18 with a root 20, a land 24 and a taper 22 extending between root 20 and land 24, wherein helical member 12 is threadingly engageable with ultracoarse threads 18. Stud 14 also has a nut-engaging portion 32 having nut-engaging threads 34 for threadingly engaging a nut 50.

Expansion anchor 10 is inserted into a hole 4 in substrate 2 so that helical member 12 and ultracoarse threaded portion 16 are within hole 4, as shown in FIG. 1. Helical member 12 frictionally engages with wall 6 to resist slippage either in a trailing direction out of hole 4 or rotationally. Stud 14 is withdrawn slightly from hole 4 so that stud 14 moves a predetermined distance with respect to helical member 12, see FIG. 2. As stud 14 is withdrawn, helical member 12 is forced to expand radially outwardly by taper 22 and land 24 from a first or unexpanded position to a second or expanded position so that helical member 12 forcefully engages with wall 6 within a hole 4 in substrate 2.

The helical shape of helical member 12 generally complements the helical shape of ultracoarse threads 18, allowing stud 14 of the present invention to be threadingly engaged and disengaged with helical member 12. Even when anchor 10 has been installed in hole 4, stud 14 can be removed from engagement with helical member 12 and withdrawn from hole 4 in substrate 2 simply by tapping on trailing end 30 of stud 14 to unwedge helical member 12 and then by unscrewing stud 14 from threaded engagement with helical member 12. Stud 14 can be reinserted back into hole 4 to be reengaged with helical member 12, or alternatively, stud 14 can be threadingly engaged with a second helical member (not shown) and inserted into a different hole in substrate 2, or in a hole in a different substrate (not shown). Removal of stud 14 can be accomplished without having to overload expansion anchor 10, forcing it to pull out of hole 4, or without having to cut stud 14.

Expansion anchor 10 of the present invention is surprisingly strong compared to conventional wedge anchors. Expansion anchor 10 has a nominal outside diameter D, or size, of stud 14, see FIG. 3. In accordance with the invention, a ½ inch stud 14 typically fails in 4000 PSI concrete at about 11,000 pounds of force due to tensile failure of stud 14 when anchor 10 has been embedded to about 4½ inches. Conventional ½ inch wedge anchors with the same concrete and embedment typically fail due to pullout at about 9,000 pounds in concrete.

Further, helical member 12 of the present invention anchors within hole 4 with such a strong force that expansion anchor 10 rarely fails due to pullout, but rather when overloaded fails due to tensile failure of stud 14, which can be predetermined accurately depending on several factors including the material of construction of stud 14. However, conventional wedge anchors typically fail due to pullout, which, as described above, is much less predictable and can occur over a large range of, for example, within about 3,000 pounds of force for a ½ inch anchor. Conversely, tensile failure can be predicted within about 50 pounds of force for a ½ inch anchor so that failure of expansion anchor 10 of the present invention is about 60 times more predictable than a conventional wedge anchor.

Expansion anchor 10 can be used for several applications in construction, or in other industries. Examples of uses of expansion anchor 10 include bracing concrete walls or floors for new construction, or as lifting anchors for concrete walls.

Stud

Turning to FIG. 3, stud 14 is generally cylindrical in shape and has a nominal diameter D, also known as the size, which corresponds to the major diameter of ultracoarse threads 18. Stud 14 includes a leading end 28 which is inserted into hole 4 of substrate (See FIG. 1), and a trailing end 30. Ultracoarse threaded portion 16 is located generally at leading end 28 and nut-engaging portion 32 extends generally between ultracoarse threaded portion 16 and trailing end 30. Helical member 12 is threadingly engageable with ultracoarse threads 18 of ultracoarse threaded portion 16 so that when leading end 28 is inserted into hole 4, helical member is also inserted into hole 4, as in shown FIG. 1.

Ultracoarse Threaded Portion

Continuing with FIG. 3, ultracoarse threaded portion 16 includes ultracoarse threads 18 having a root 20, a crest 24, and a taper 22 that extends between root 20 and the crest at a predetermined angle è. In a preferred embodiment, crest 24 of ultra-coarse threads 18 is a land 24 having an axial length L to provide for friction between at least a portion of helical member 12 and land 24 when helical member is in its expanded position.

The pitch P of ultracoarse threads 18 is substantially larger than the pitch of Unified National Coarse (UNC) threads. For a ½ inch stud 14 pitch P of ultracoarse threads 18 in one embodiment is about 0.67 inches, nearly ten times greater than the 0.077 inch pitch of Unified National Coarse (UNC) threads. The longer pitch P allows movement of helical member 12 from an unexpanded position at root 20 along taper 22 to an expanded position at land 24. Longer pitch P also allows helical member 12 to be wider in the axial direction, which can provide for stronger anchoring with wall 6 of hole 4.

In a preferred embodiment for a ½ inch anchor, wherein wall 6 of hole 4 has a diameter of about 0.520 inches, the minor or root diameter of ultracoarse threads 18 is between about 0.380 inches and about 0.385 inches and the major or outside diameter of land 24 is between about 0.500 inches and about 0.508 inches and taper 22 extends between root 20 and land 24 at an angle è of about 10°. Preferably, ultracoarse threaded portion 16 has a total of more than 1 and preferably between about 1.5 and about 4 full turns of ultracoarse threads 18 to cover at least about 360° of contact with stud 14. In one embodiment, the pitch P of ultracoarse threads 18 is about 0.67 inches, and there are about 3 full turns of ultracoarse threads 18 so that the length of ultracoarse threaded portion 16 is about 2 inches.

Root

Continuing with FIG. 3, root 20 is generally helical in shape which generally complements the shape of helical member 12. In one embodiment, root 20 includes a root surface 36 that has a generally constant diameter and an axial length R, wherein helical member 12 can abut against root surface 36, as shown in FIG. 1. In one embodiment for a ½ inch stud 14, the axial length R of root surface 36 per turn of ultracoarse threads 18 is about 0.23 inches. In one embodiment, the length R of root surface 36 is between 0% and about 45% and preferably about 35% of pitch P.

Land

Crest or land 24 is the portion of ultracoarse threads 18 having the largest diameter and is located at radially outermost point or surface of ultracoarse threads 18 between adjacent turns of root 20. Land 24 has a generally helical shape that corresponds to the shape of helical member 12 and has a generally constant outside or major diameter and an axial length L. The major diameter of land 24 should be smaller than the inside diameter of hole 4, so that land 24 does not interfere with insertion of stud 14 into hole 4, but large enough so that helical member 12 engages with wall 6 when helical member 12 is in the expanded position.

Preferably, land 24 comprises a surface 40 remaining after ultracoarse threads 18 have been machined in stud 12, so that the diameter of land 24 is generally equal to the size D, or outer diameter of stud 14. In one embodiment, land 24 is generally square, that is, its outside surface 40 is generally parallel to a central axis of stud 14. It will be understood that other crest shapes, such as a "V", a saw tooth, or a rounded crest, may be substituted without departing from the spirit of the present invention.

Preferably the axial length L of land 24 per turn of ultracoarse threads 18 is large enough to provide adequate frictional force in the axial direction between helical member 12 in an expanded mode and land 24. This frictional force helps provide the strength of anchoring between helical member 12 and stud 14. In one embodiment of a ½ inch stud 14, the axial length L of land 24 is about 0.125 inches. In one embodiment, the length L of land 24 is between about 10% and about 25%, and preferably about 20% of the pitch P.

Taper

Continuing with FIG. 3, taper 22 is generally helical in shape and extends generally linearly between root 20 and land 24. Taper 22 increases in diameter in the direction extending from trailing end 30 toward leading end 28 at a predetermined angle è, wherein angle è is an important aspect of the present invention. The size of angle è is a factor in how much frictional force there must be between wall 6 and helical member 12 for helical member 12 to remain frictionally engaged with wall 6, as well as how long of a pitch P will be required to expand helical member 12 to the expanded position to forcefully engage with wall 6, as shown in FIG. 2. Taper 22 has a length in the axial direction T. In one embodiment, for a ½ inch stud 14, taper 22 has an axial length T per turn of threads 18 of about 0.31 inches. In one embodiment, the axial length T of taper 22 is between about 30% and about 90%, and preferably about 50% of the pitch P.

Taper Angle

The following considerations have been found to apply in selecting, or optimizing, the angle è of taper 22 with respect to land 24.

A small angle è provides for adequate initial friction between wall 6 and helical member 12, preventing initial slippage of helical member 12 along wall 6 as stud 14 begins to withdraw, but, a small angle è may not result in adequate radial and frictional forces against wall 6 after withdrawal to provide expansion anchor 10 with a high anchoring strength. A large angle è might be expected to provide high radial and frictional forces at the end of withdrawal, but, as withdrawal of stud 14 is begun, it may not provide for adequate initial friction to hold helical member 12 in place against wall 6. Initial slippage refers to radial or longitudinal movement of helical member 12, which is undesirable because helical member 12 must become lodged against wall 6 for anchor to take place.

In accordance with the present invention, angle è is selected to provide sufficient initial friction against wall 6 to resist initial slippage of helical member 12 at the beginning of withdrawal of the stud 14, while also providing a sufficient rate of movement of stud 14 in the axial direction to expand helical member 12 to provide a predetermined anchoring force to adequately resist pullout when stud 14 is withdrawn by a predetermined distance with respect to helical member 12 and anchoring is complete.

It has been found that the optimal range for angle è is between about 5 degrees and about 12 degrees, preferably between about 9 degrees and about 11 degrees, and still more preferably about 10 degrees.

Pocket

Returning to FIG. 3, a pocket 37 is formed between adjacent turns of ultracoarse threads 18. In one embodiment, helical member 12 is threadingly engaged with ultracoarse threaded portion 16 so that helical member 12 rests substantially within pocket 37 when it is in an unexpanded position and a leading edge 39 is wedged between land 24 and wall 6 in an expanded position. In a preferred embodiment, shown in FIG. 3, pocket 37 is framed by taper 22 on the leading end, a leading thread surface 38 on the trailing end and root surface 36 so that the cross-section of pocket 37 is generally trapezoidal in shape.

Helical Member

Turning to FIG. 4, helical member 12 has a generally helical shape that complements the helical shape of ultracoarse threads 18. In one embodiment, helical member 12 has a shaped cross-section, and in a preferred embodiment, the cross-section of helical member 12 is shaped to fit generally within pocket 37 of ultracoarse threaded portion 16 by generally corresponding to the profile of ultracoarse threads 18.

Helical member 12 has a pitch PM that is approximately equal to the pitch P of ultracoarse threads 18 of stud 14, shown in FIG. 3. If pitch P of ultracoarse threads 18 and pitch PM of helical member 12 were not substantially equal, it would be difficult to threadingly engage helical member 12 with stud 14 because the helical shape of helical member 12 would not complement the helical shape of ultracoarse threads 18.

The preferred cross-sectional shape of helical member 12 is shown in FIG. 5, wherein helical member 12 includes a body 41 having an axial length M. In one embodiment, helical member 12 includes a finger 42 having an axial length F extending in a leading direction from body 41, wherein finger 42 is thinner than body 41. In one embodiment, helical member 12 has a cross-sectional shape so that it will generally fit within pocket 37 between ultracoarse threads 18 of ultracoarse threaded portion 16. For the embodiment of ultracoarse threaded portion 16 shown in FIG. 1 and described above, wherein pocket 37 is framed by leading thread surface 38, root surface 36 and taper 22, helical member 12 includes a root contacting surface 43 having an axial length S corresponding to root surface 36 and a taper-engaging finger surface 44 proximate leading edge 39. In a preferred embodiment, taper-engaging finger surface 44 is angled with respect to root contacting surface 43 by a predetermined angle á so that taper-engaging finger surface 44 is generally parallel to taper 22. Helical member 12 also includes an outer surface 46 which forcefully engages with wall 6 after expansion.

Preferably, the axial length S of root contacting surface 43 in FIG. 5 is less than the axial length R of root surface 36 shown in FIG. 3, and the axial length F of finger 42 shown in FIG. 5 is preferably less than the axial length T of taper 22 so that helical member 12 fits within pocket 37. Preferably, taper-engaging finger surface 44 is angled relative to root contacting surface 43 at an angle á that is approximately equal to the angle è of taper 22 so that helical member 12 will more easily be forced radially outwardly by taper 22 as stud 14 is withdrawn from hole 4. For example, if angle è of taper 22 is about 10°, angle a can also be about 10°.

In one embodiment, shown in FIG. 1, root contacting surface 43 is in contact with root surface 36 and taper-engaging finger surface 44 is in contact with taper 22 when helical member 12 is in the unexpanded position so that helical member 12 generally abuts root 20 and taper 22. In another embodiment (not shown), root contacting surface 43 is not in contact with root surface 36 and taper-engaging finger surface 44 is not in contact with taper 22 when helical member 12 is in the unexpanded position, so that helical member is loose with respect to root 20. A loose helical member 12 may allow outer surface 46 to be in contact with wall 6 to frictionally engage with wall 6.

In one embodiment, shown in FIGS. 4, 5 and 6, helical member 12 includes one or more protrusions 48 or 49 which protrude radially outwardly from outer surface 46 to ensure that helical member 12 frictionally engages with wall 6 after expansion anchor 10 has been inserted into hole 4. Initial frictional engagement of helical member 12 with wall 6 is important to ensure that helical member 12 does not withdraw with stud 14, but rather remains generally stationary, when stud 14 is withdrawn from hole 4, as described below. The protrusions can be one of several embodiments, such as a bump 48 shown in FIG. 5 or a slightly upturned trailing end 49 shown in FIG. 6.

The effective outside diameter of helical member 12, including protrusions 48 or 49 should be approximately equal to, or slightly larger than the effective inside diameter of wall 6 so that helical member 12 frictionally engages with wall 6 of hole 4, as shown in FIG. 1. If no protrusions are included on helical member 12, the diameter of outside surface 40 should be large enough to frictionally engage with wall 6 of hole 4 in the unexpanded position so as to prevent movement of helical member 12 with stud 14 when stud 14 is withdrawn out of hole 4, but not so large that it interferes with insertion of expansion anchor 10 into hole 4.

As helical member 12 moves from its unexpanded position to its expanded position, at least finger 42 of helical member 12 is forced radially outwardly by taper 22 so that the outside diameter of helical member 12 becomes larger until outside surface 46 compresses against wall 6 so that helical member 12 is deformed between stud 14 and wall 6, as shown in FIG. 2.

As shown in FIG. 4, preferably there is more than one turn of helical member 12 so that when it moves from the unexpanded position to the expanded position and expands radially outwardly, it is still in contact with stud 14 about 360° or more around stud 14. In a preferred embodiment, helical member 12 has at least 1, and preferably at least about one and a half turns in the unexpanded position so that it is in contact with at least about 540° of the circumference of stud 14.

When helical member 12 moves to the expanded position, the larger effective diameter of taper 22 forces helical member 12 to expand radially outwardly so that helical member 12 is in contact with between about 460° and about 480° of the circumference of stud 14 so that helical member 12 anchors with the entire circumference of stud 14.

A conventional wedge anchor cannot anchor around the entire 360° of the stud because conventional anchors typically only have 360° of coverage when unexpanded, so that when they expand, they are in contact with less than 360° of the circumference of the stud.

Nut-engaging Portion

Returning to FIG. 3, nut-engaging portion 32 of stud 14 extends between ultracoarse threaded portion 16 and trailing end 30. Nut-engaging portion 32 includes nut-engaging threads 34 which engage with the threads (not shown) of a nut 50. In one embodiment, the outside diameter of nut-engaging threads 34 is approximately equal to the outside diameter of land 24 of ultracoarse threaded portion 16, and the root diameter of nut-engaging threads 34 is slightly smaller than the root diameter of ultracoarse threaded portion 16.

In order to anchor stud 14 within hole 4, ultracoarse threaded portion 16, including helical member 12, are inserted into hole 4 until substrate surface 8 is adjacent to nut-engaging portion 32, as shown in FIG. 1. Nut 50 can be rotated until it is flush with a washer or fixture 52 to be supported by anchor 10. Nut 50 is then tightened so that nut 50 engages with nut-engaging threads 34 of nut-engaging portion 32 to withdraw stud 14 in a trailing direction out of hole 4. As stud 14 is withdrawn from hole 4, helical member 12 remains substantially stationary due to the frictional engagement between wall 6 and helical member 12. As stud 14 continues to withdraw, finger 42 of helical member 12 is forced radially outwardly by taper 22 to forcibly engage helical member 12 with wall 6, eventually forcing finger leading edge 39 of finger 42 to be wedged and deformed between land 24 and wall 6. Nut 50 also holds stud 14 and washer or fixture 52 in place during anchoring.

Nut-engaging threads 34 can be of any thread form so longs as they complement the thread form of the threads of nut 50 (not shown). Preferably, nut-engaging threads 34 and the threads of nut 50 are standardized threads, such as Unified National Coarse (UNC) threads, Unified National Fine (UNF) threads or standard metric threads, so that a standardized nut can be used with stud 14. In a preferred embodiment, nut-engaging threads 34 and the threads of nut 50 are Unified National Coarse threads so that nut-engaging threads 34 of a ½ inch stud 14 have a major diameter of 0.500 inches and 13 threads per inch. Although standardized threads are preferred, customized thread forms can be used for nut-engaging threads 34 and the threads of nut 50 so long as nut-engaging threads 34 complement the threads of nut 50 so that nut 50 can be threadingly engaged with nut-engaging threads 34.

Although nut-engaging threads 34 and nut 50 are a preferred means for withdrawing stud 14 out of hole 4 and for clamping stud 14 in place, other withdrawing means and holding means could be used without varying from the scope of the present invention, as would be understood by one having ordinary skill in the art.

Stud 14 should be manufactured out of a material that is strong enough to withstand the forces that stud 14 may be expected to encounter. In a preferred embodiment, stud 14 is manufactured from steel, such as carbon steel, heat treated carbon steel, plated steel, 1022 to 1033 cold rolled steel, 304 stainless steel, 316 stainless steel, 18-8 stainless steel, which can withstand a force of about 11,000 pounds within about 50 pounds, before tensile failure for a ½ inch stud and about 18,000 to about 20,000 pounds within about 50 pounds, before tensile failure for a ¾ inch stud. Both ultracoarse threaded portion 16 and nut-engaging portion 32 of stud 14 can be manufactured by rolling.

Helical member 12 should be made out of a material that is able to expand from the unexpanded position to the expanded position, that is strong enough to anchor with substrate 2, and that is soft enough so it deforms when expansion anchor 10 is anchored within substrate 2 and does not easily broach through substrate 2. For example, when substrate 2 is concrete, preferred materials of construction for helical member 12 are 303 stainless steel or 304 stainless steel, because it is expandable, strong, and soft enough to be deformed between stud 14 and substrate 2. A softer material, such as 304 stainless steel, allows helical member 12 to forcibly engage with wall 6 by being wedged between wall 6 and stud 14, as shown in FIG. 2. Helical member 12 can be manufactured by rolling, as with stud 14, or by coining or shaving.

Helical member 12 and stud 14 are threadingly engaged with each other by screwing helical member 12 onto ultracoarse threaded portion 16 of stud 14 so that helical member 12 is disposed around root 20 of ultracoarse threaded portion 16 between adjacent turns of ultracoarse threads 18. Helical member 12 can be threadingly engaged with stud 14 after both helical member 12 and stud 14 have been manufactured, and helical member 12 can be threadingly disengaged from ultracoarse threaded portion 16 of stud 14 at any point after they have been assembled.

Method of Use

The method of anchoring stud 14 in substrate 2 includes the steps of providing a stud 14 having a leading end 28 with threads, such as ultracoarse threads 18, having a root 20, a land 24, and a taper 22 that extends between root 20 and land 24, providing a helical member 12 having a leading edge 39, threadingly engaging helical member 12 with ultracoarse threads 18, inserting leading end 28 of stud 14 into a hole 4 in a substrate 2, the hole 4 having a wall 6, withdrawing stud 14 from hole 4 so that stud 14 moves a predetermined distance relative to helical member 12, and expanding helical member 12 until at least leading edge 39 is wedged between land 24 and wall 6.

Another method of the present invention includes the additional steps of forming hole 4 in a substrate 2, such as by drilling hole 4, disengaging stud 14 from threaded engagement with helical member 12 and removing stud 14 from hole 4, reinserting stud 14 into hole 4 and threadingly reengaging stud 14 with helical member 12 within hole 4 or threadingly engaging stud 14 with a second helical member (not shown) and inserting stud 14 and the second helical member into a second hole (not shown) for anchoring after removing stud 14 from hole. The withdrawing step described above can include tightening a nut 50, such as against substrate surface 8 or washer or fixture 52, in order to withdraw stud 14 from hole 4 by at least the predetermined distance.

Forming Hole in Substrate

The drilling step starts by selecting the location in which expansion anchor 10 is desired to be placed, and then drilling a hole 4 of the desired size. Hole 4 should have a diameter that is slightly larger than the largest diameter of stud 14, i.e. a hole diameter of about 0.520 inches for a ½ inch stud 14. Hole 4 can be drilled by any number of methods or tools that are well known in the art, such as a specialized drill bit designed for substrate 2, i.e. a carbide tipped bit for concrete. Alternatively, hole 4 can be preformed at the time substrate 2 is produced, such as by molding, in which case hole 4 would not need to be drilled.

Inserting Leading End Into Hole

After a hole 4 or orifice is formed in substrate 2, leading end 28 of stud 14, including ultracoarse threaded portion 16 and helical member 12, is inserted into hole 4 so that protrusions 48 or 49 of helical member 12 are frictionally engaged with wall 6. Preferably, stud 14 is inserted into hole 4 so that the entire length of ultracoarse threaded portion 16 and a portion of nut-engaging portion 32 are within hole 4.

Withdrawing Stud

After inserting leading end 28 of stud 14 into hole 4 so that stud 14 is at a predetermined depth, nut 50 is placed on stud 14 and rotated so that it moves along nut-engaging threads 34 of nut-engaging portion 32 towards leading end 28 of stud 14 until nut 50 is flush with substrate surface 8. Nut 50 is tightened for several rotations so that the threads of nut 50 (not shown) engage with nut-engaging threads 34 of nut-engaging portion 32 to withdraw stud 14 from hole 4. Nut 50 should be tightened at a high enough torque so that stud 14 can overcome friction between stud 14 and helical member 12 so that stud 14 moves relative to helical member 12 so that stud 14 is withdrawn back out of hole 4. Nut 50 should also be tightened for enough rotations so that stud 14 is withdrawn from hole 4 by at least the predetermined distance that stud 14 moves relative to helical member 12 so that helical member 12 is forced from the unexpanded position to the expanded position. In a preferred method for a ½ inch anchor 10, nut 50 is tightened between about 3 to about 5 rotations at about 55 foot-pounds of torque, which withdraws ½ inch stud 14 between about 0.12 inches and about 0.30 inches, and preferably about 0.266 inches or more from hole 4.

Expanding Helical Member

As nut 50 is tightened with a proper torque for a predetermined number of rotations, stud 14 is withdrawn out of hole 4 while helical member 12 is frictionally engaged with wall 6 of hole 4 so that stud 14 is moving while helical member 12 is or becomes substantially stationary within hole 4. As stud 14 is withdrawn out of hole 4, the increasing diameter of taper 22 forces helical member 12 to expand radially outwardly. Eventually, leading edge 39 of helical member 12 becomes wedged between land 24 and wall 6 so that helical member 12 forcibly engages with wall 6, and in a preferred embodiment of the method a portion of finger 42 of helical member 12 becomes deformed and wedged between land 24 and wall 6, as shown in FIG. 2, creating friction between wall 6 and helical member 12, between helical member 12 and land 24, and between helical member 12 and taper 22, which holds stud 14 within hole 4 with a surprisingly strong force.

Disengaging Stud

The complementary helical configurations of helical member 12 and ultracoarse threads 18 allow for a disengaging step between stud 14 and helical member 12. In order to remove and disengage stud 14 from its threaded engagement with helical member 12, nut 50 is loosened by rotating nut 50 in a direction opposite to the direction it was rotated with tightening nut 50. Preferably nut 50 is loosened by one or more complete turns so that nut 50 is spaced slightly from substrate surface 8.

After loosening of nut 50, trailing end 30 of stud 14 is tapped, and stud 14 is rotated in a disengaging direction, for example counterclockwise, so that it is screwed out of helical member 12 and hole 4. In this way, helical member 12 acts like the threads of a threaded hole and ultracoarse threads 18 of stud act like the threads of a screw being removed from the threaded hole. If stud 14 is continually rotated in the disengaging direction, ultracoarse threaded portion 16 eventually becomes threadingly disengaged from helical member 12, at which point stud 14 can be fully removed from hole 4 by simply pulling stud 14 out of hole 4.

Reengaging Stud With Helical Member

The complementary configurations of helical member 12 and ultracoarse threads 18 of ultracoarse threaded portion 16 also allow for a step of reinserting stud 14 and threadingly reengaging ultracoarse threads 18 with helical member 12. Further, if anchoring stud 14 in a first hole 4 is no longer needed, stud 14 can be disengaged from the helical member 12 in the first hole and then reused with a second helical member in a second hole (not shown), so long as the helical shape of the second helical member complements the helical shape of ultracoarse threads 18.

The ability to reuse stud 14 is an advantage for the present invention, because stud 14 can be removed from without being broached out of hole 4, which tends to deform ultracoarse threaded portion 16, helical member 12, and substrate 2, or without having to cut stud 14. In the case of breaking or broaching expansion anchor 10 or cutting stud 14, stud 14 becomes unusable. Stud 14 is typically a relatively expensive part, as it is typically made from a relatively large quantity of steel and is used in large quantities. A removable and reusable stud, such as stud 14 described above, allows a single stud 14 to be reused several times, cutting down on material costs for an installer of expansion anchor 10.

The anchor of the present invention provides for a very strong hold within a substrate, such as concrete, masonry or cement. In the event of overloading, the anchor is designed to fail only under high forces, and then only due to tensile strength failure of the stud, rather than pullout failure of the helical member. Further, the helical shape of the helical member permits contact between the helical member and the stud around the entire circumference of the stud, even when the helical member is in the expanded position. Moreover, the complementary helical shapes of the helical member and the ultra-coarse threads of the anchor portion of stud allows stud to be removable and reusable width respect to helical member.

The present invention is not limited to the above-described embodiments, but should be limited solely by the following claims.

What is claimed is:

1. An expansion anchor comprising:

a stud having threads including a root, a land, and a taper extending between said root and said land; and a helical member threadingly engageable with said threads, said helical member having a leading edge;

wherein said helical member is movable between an unexpanded position and an expanded position, wherein in the expanded position said leading edge is forced radially outwardly by said land, and said helical member includes a body and a finger thinner than said body, said finger having said leading edge, and wherein a root contacting surface of said body has an axial length of less than a corresponding axial length of said root, and said finger having an axial length of less than an axial length of said taper, and an angle with respect to said land substantially complementary with an angle of said taper with respect to said land.

2. An expansion anchor according to claim 1, wherein said taper extends at a predetermined angle between about 9 degrees and about 11 degrees with respect to said land.

3. An expansion anchor according to claim 1, wherein said taper extends at a predetermined angle of about 10 degrees with respect to said land.

4. An expansion anchor according to claim 1, wherein said helical member includes a taper-engaging surface proximate said leading edge, said taper-engaging surface being generally parallel to said taper when said helical member is in the unexpanded position.

5. An expansion anchor according to claim 1, wherein said helical member is threadingly disengageable with said threads.

6. An expansion anchor according to claim 1, wherein said helical member is softer than said stud such that said helical member deforms when the expansion anchor is anchored within a substrate.

7. An expansion anchor according to claim 1, wherein said helical member is made from 304 stainless steel.

8. An expansion anchor according to claim 1, wherein said helical member further comprises an outer surface and a protrusion extending radially outwardly from said outer surface.

9. An expansion anchor according to claim 1, wherein said stud further comprises threads for threadingly engaging a nut.

10. An expansion anchor comprising:

a helical member and a stud having threads including a root, a land, and a taper extending between said root and said land; and said helical member being threadingly engageable with said threads and having a finger extending in a leading direction;

wherein said helical member is movable between an unexpanded position and an expanded position, and said helical member includes a body and a finger thinner than said body, said finger having said leading edge, and wherein a root contacting surface of said body has an axial length of less than a corresponding axial length of said root, and said finger having an axial length of less than an axial length of said taper, and an angle with respect to said land substantially complementary with an angle of said taper with respect to said land.

* * * * *